(12) United States Patent
Schneider

(10) Patent No.: US 9,447,756 B2
(45) Date of Patent: Sep. 20, 2016

(54) METHOD FOR OPERATING A STATIC GAS TURBINE, AND INTAKE DUCT FOR INTAKE AIR OF A GAS TURBINE

(75) Inventor: Oliver Schneider, Wesel (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/233,626

(22) PCT Filed: Jul. 13, 2012

(86) PCT No.: PCT/EP2012/063777
§ 371 (c)(1),
(2), (4) Date: Jan. 17, 2014

(87) PCT Pub. No.: WO2013/010935
PCT Pub. Date: Jan. 24, 2013

(65) Prior Publication Data
US 2014/0196437 A1    Jul. 17, 2014

(30) Foreign Application Priority Data
Jul. 21, 2011 (EP) .................................... 11174857

(51) Int. Cl.
*F02C 7/052* (2006.01)
*F02M 35/10* (2006.01)
*F02C 7/05* (2006.01)

(52) U.S. Cl.
CPC ................ *F02M 35/10* (2013.01); *F02C 7/05* (2013.01); *F02C 7/052* (2013.01)

(58) Field of Classification Search
CPC .......... F02C 3/305; F02C 7/05; F02C 7/052; F02M 35/082; F02M 35/10; F01D 25/002; B64D 2033/0246
See application file for complete search history.

(56) References Cited

U.S. PATENT DOCUMENTS

| 6,666,026 B2 | 12/2003 | Jungsch |
| 7,648,564 B2 | 1/2010 | Chillar et al. |
| 7,712,301 B1 | 5/2010 | Wagner |
| 2001/0004828 A1 | 6/2001 | Nakamoto |
| 2007/0059159 A1* | 3/2007 | Hjerpe .......................... 415/117 |
| 2008/0047425 A1* | 2/2008 | Loda ...................... B64D 33/02 95/1 |

(Continued)

FOREIGN PATENT DOCUMENTS

| CN | 101487422 A | 7/2009 |
| DE | 19622057 A1 | 12/1997 |
| EP | 1199442 A2 | 4/2002 |
| GB | 1201096 A | 8/1970 |
| JP | S55162178 A | 12/1980 |

(Continued)

OTHER PUBLICATIONS

Machine translation of JP H11-324708 A, accessed on Jul. 13, 2015.*

*Primary Examiner* — Jonathan Matthias
(74) *Attorney, Agent, or Firm* — Beusse Wolter Sanks & Maire

(57) ABSTRACT

An ambient air intake duct of a static gas turbine is provided, having at least one filter, which is arranged in the intake duct, for cleaning the ambient air (A) that can flow through the intake duct. A method for operating a static gas turbine which is equipped with a filter for cleaning the ambient air (A) is also provided. To rapidly provide a higher level of gas turbine power to a generator, it is provided that, by means of a bypass or by means of flaps arranged downstream of the filter, partially to completely unfiltered ambient air (A) can temporarily flow into the compressor inlet.

18 Claims, 2 Drawing Sheets

(56) References Cited

U.S. PATENT DOCUMENTS

| | | |
|---|---|---|
| 2008/0250769 A1 | 10/2008 | Wagner |
| 2010/0198419 A1* | 8/2010 | Sonoda ............... F01D 17/16 700/290 |
| 2011/0016876 A1* | 1/2011 | Cataldi et al. ............... 60/773 |
| 2012/0111011 A1* | 5/2012 | Pike ............... 60/722 |
| 2012/0222359 A1* | 9/2012 | Ayshford ............... E05F 1/02 49/387 |

FOREIGN PATENT DOCUMENTS

| | | |
|---|---|---|
| JP | S5784333 A | 5/1982 |
| JP | H11324708 A | 11/1999 |
| JP | 2004218588 A | 8/2004 |
| RU | 2414611 C2 | 3/2011 |
| SU | 1746011 A1 | 7/1992 |
| WO | 9746796 A1 | 12/1997 |

* cited by examiner

METHOD FOR OPERATING A STATIC GAS TURBINE, AND INTAKE DUCT FOR INTAKE AIR OF A GAS TURBINE

CROSS REFERENCE TO RELATED APPLICATIONS

This application is the US National Stage of International Application No. PCT/EP2012/063777 filed Jul. 13, 2012, and claims the benefit thereof. The International Application claims the benefit of European Application No. EP11174857 filed Jul. 21, 2011. All of the applications are incorporated by reference herein in their entirety.

FIELD OF INVENTION

The invention relates to a method for operating a static gas turbine equipped with a filter for purifying the intake air. The invention also relates to an intake duct for intake air of a static gas turbine, having at least one filter arranged in the intake duct for purifying the intake air which can be made to flow through the intake duct.

BACKGROUND OF INVENTION

Static gas turbines are usually equipped with filters, arranged in the intake duct or in an intake housing, for the purpose of purifying the ambient air drawn in by the compressor. In this context, a plurality of filters are often connected one after another and free the drawn in ambient air, also called intake air, initially from relatively coarse dirt particles and then from relatively small dirt particles. Purifying the intake air is necessary on one hand in order to avoid deposits on the compressor blades and associated ageing processes in the compressor which would lead to a reduction in the efficiency of the compressor and thus to a reduction in the efficiency of the gas turbine. It is also necessary that particularly pure cooling air is provided to the hot gas components employed in the turbine as, without this, deposits could jeopardize reliable cooling of the components.

It is also known that, as well as the energy required for immediate electricity generation, static gas turbines must also often keep power reserves ready in order to be able to limit those fluctuations which are present in the electrical distribution grid in the form of changes in the grid frequency. In this context, it is known that, for what is referred to as frequency support, power reserves can be mobilized and made available at short notice, in that, upstream of the compressor inlet, a fluid is introduced, thus increasing, at short notice and for a short period, the mass flow rate and thus the power output of the gas turbine. This method is known as frequency support by wet compression.

It is further known, during rated operation of the gas turbine, to overfire the gas turbine for a short time and thus raise the power output of the gas turbine to above 100% of the rated load, in order to carry out the required grid support. Such frequency support measures initiated for this purpose usually last for no longer than 15 minutes as, during this time, further grid support measures are brought in and taken such that the quick reaction—wet compression or overfiring—of the running installations can be withdrawn.

SUMMARY OF INVENTION

It is an object of the invention to provide an alternative method by means of which the power output of the gas turbine can be increased at short notice, for example for frequency support. It is a further object of the invention to provide an intake duct for a gas turbine, by means of which duct such a method can be carried out.

The object directed to the method is achieved by means of a method as described herein. The object directed to the apparatus is achieved by means of an intake duct according to the features described herein. Advantageous configurations of the invention are also further described herein.

The invention is based on the knowledge that, when the gas turbine is in operation, a loss of pressure results from the filtering of the air in the intake duct. This loss of pressure reduces the power produced by the gas turbine and lowers the efficiency of the latter. It is now provided, according to the invention, to eliminate this loss of pressure at short notice and for a short time, and thus to make an increase in the power of the gas turbine available to the generator connected thereto. In order to achieve this, a bypass for circumventing the filter or filters and/or at least one closable opening, arranged downstream of the filter or filters, is provided, preferably in the form of flaps, in a wall of the intake duct for letting in ambient air. With the aid of the bypass or, respectively, the closable openings, it is possible for ambient air which is at least partially unfiltered, but preferably entirely unfiltered, to flow into the compressor belonging to the gas turbine. By opening the flaps or, respectively, the bypass, it is possible to eliminate the power-reducing loss of pressure at the filters. The power output of the gas turbine is then increased by adding extra fuel, without this resulting in overfiring. Overfiring, which shortens the life of the components for guiding hot gases, can thus be avoided while still increasing power output.

This method is preferably used in the event of frequency support. However, as the particles suspended in the ambient air then flow into the gas turbine, it is advantageous to limit the time for this phase of operation of the gas turbine. It is preferably provided, in this context, that operation according to the invention is carried out for a maximum predefined time, for example 15 minutes. Following this phase of operation, i.e. immediately after or shortly after—within one hour, a compressor wash is preferably carried out. For this, it is known that a relatively large quantity of a cleaning fluid in drop form is introduced into the intake duct upstream of the compressor; this fluid can then flow into the compressor, where it can clean the blading of the compressor of the particles deposited thereon during operation with unfiltered air. It is thus possible for the ageing phenomena which briefly appear in the compressor to be reversed.

BRIEF DESCRIPTION OF THE DRAWINGS

Further advantages and features of the invention are apparent with reference to an exemplary embodiment illustrated in the drawing, in which.

DETAILED DESCRIPTION OF INVENTION

Figure 1:
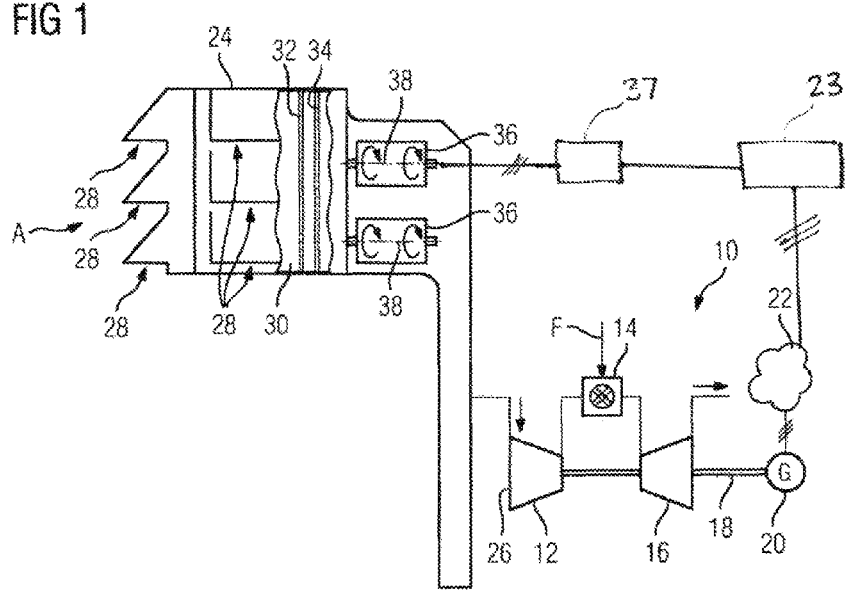
FIG. 1 & FIG. 2 show a side view of an intake duct having flaps arranged in the duct wall.

FIG. 1 schematically shows a static gas turbine 10 having a compressor 12, a combustor 14 and a turbine unit 16. A rotor 18 of the gas turbine 10 is connected to a generator 20, which feeds the electrical energy that it produces into an electrical distribution grid 22.

An intake duct 30 is provided in an intake housing 24 connected upstream of the compressor 12 and connects openings 28 of the intake housing 24 to the inlet 26 of the compressor 12. According to the exemplary embodiment shown, two filters 32, 34 are provided, connected one behind the other, in the intake duct 30. More or fewer filters may also be provided. The filters 32, 34 serve to clean the ambient air A drawn in of suspended particles and particles contained therein.

Figure 2:
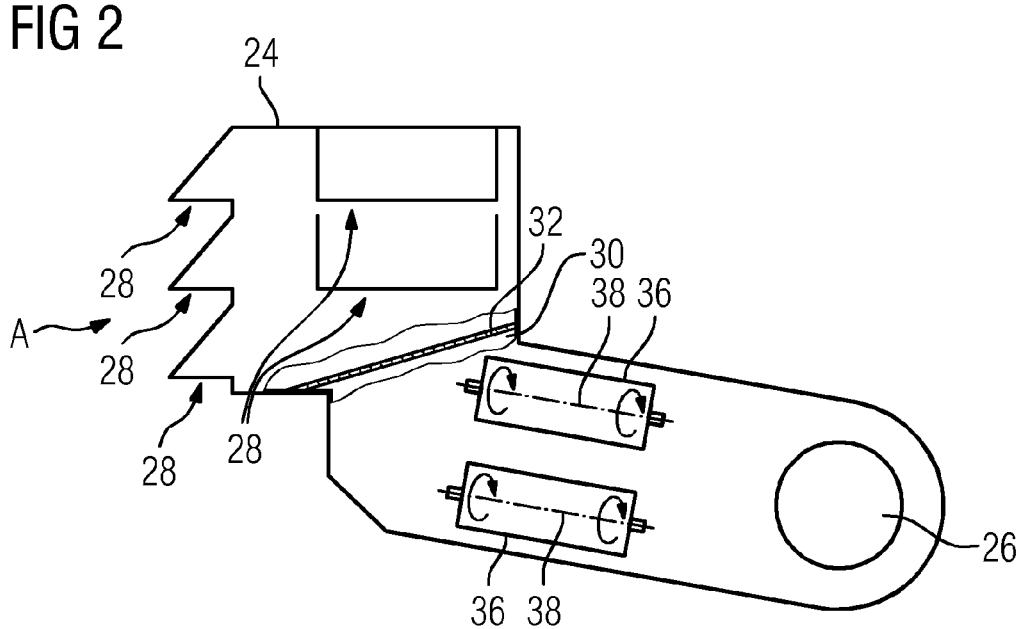

A plurality of large flaps 36, by means of which the intake duct 30 can be directly connected to the surroundings and isolated therefrom, are provided as closable openings downstream of the filters 32, 34 in a duct wall of the intake duct 30; see also FIG. 2. To that end, the flaps 36 are mounted pivotably about a longitudinal axis 38. An associated drive unit 37 is provided for pivoting the flaps 36, i.e. for opening and closing the flaps 36.

Furthermore, coarse protective grilles (not shown) can be provided in front of the flaps 36 or, respectively, at the openings 28 without a loss of pressure. These prevent relatively large objects or birds from entering the intake duct 30. In all, the flaps 36 are arranged such that the flow through the filters 32, 34, which are still present, is not disrupted.

The exemplary embodiments shown in FIGS. 1 and 2 differ in that, on one hand, it is possible for the intake housing 24 to be arranged on the gas turbine 10 such that it is in line (FIG. 1) or positioned to the side (FIG. 2).

During conventional operation of the gas turbine, the flaps 36 are closed and the compressor 12 draws ambient air A into the intake duct 30 through the openings 28. This air passes through the filters 32, 34 and, in so doing, is freed first from relatively large and then from relatively small suspended particles and particles. The filtered intake air then flows further through the intake duct 30 to the inlet 26 of the compressor 12 and is then, in a known manner, compressed and burnt with fuel F in the combustor 14.

Figure 3:
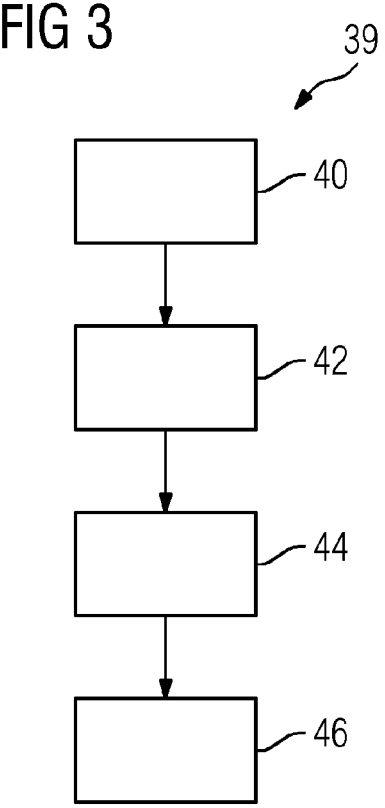
FIG. 3 shows a flow chart of the method according to the invention.

The method 39 for increasing power is shown in FIG. 3. In a first step 40, a request for more power to be delivered to the generator 20 than previously is raised at a gas turbine regulator 23. This can for example be the case if the grid frequency of the electrical distribution grid 22 drops and thus a frequency support event exists. In this case, in a second step 42, the regulator 23 then orders the drive unit 37 to open the flaps 36. Ambient air A which is at least partially unfiltered or entirely unfiltered can thereby flow into the compressor inlet 26 of the gas turbine 10. As a result of the flaps 36 being opened, the ambient air circumvents the filters 32, 34, a process also known as bypassing. The gas turbine 10 is then able to output more power, without overfiring or wet compression. In a third method step 44, the flaps 36 are closed again, whereby the ambient air A drawn in by the compressor 12 then has to flow through the filters 32, 34. The closure of the flaps 36, respectively the third method step 44, can be brought about, on one hand, by the end of the frequency support event or the frequency support request. On the other hand, it is also possible for the flaps 36 to be closed after the maximum operating time drawing in unfiltered ambient air has elapsed. According to a fourth, optional step 46, a compressor wash is carried out immediately or soon after the closing of the flaps 36. The compressor wash can be carried out as an online wash or as an offline wash.

In principle, the invention comprises using a bypass to minimize the intake losses of a static gas turbine 10, and thus in raising the gas turbine power, for short-notice operational states such as grid support operation. The simplicity of the measure according to the invention results in low additional costs for installing and maintaining the flaps 36, while the industrial usefulness of the gas turbine 10 equipped with the invention is significantly increased.

Other elements, such as sliding windows or similar, may of course also be provided instead of the flaps 36.

In all, the invention thus relates to an intake duct 30 for drawn in ambient air of a static gas turbine 10, having at least one filter 32, 34 arranged in the intake duct 30 for purifying the intake air A which can be made to flow through the intake duct 30. The invention further relates to a method for operating a static gas turbine 10 equipped with a filter 32, 34 for cleaning the intake air A. In order to make a higher gas turbine power available to a generator 20 at short notice, it is provided that, by means of a bypass or by means of flaps 36 arranged downstream of the filters 32, 34, from time to time partially to entirely unfiltered ambient air A can flow into the compressor inlet 26. As a consequence, the pressure losses caused by the filters 32, 34 are eliminated at short notice.

The invention claimed is:

1. An arrangement for operating a static gas turbine, comprising:
    an intake duct for intake air of the static gas turbine, having at least one filter arranged in the intake duct for drawing in and purifying the intake air during conventional operation which can be made to flow through the intake duct,
    a regulator adapted to receive a request for more power output from a gas turbine regulator in response to a determination of a frequency support event based on a monitored grid frequency;
    a bypass comprised of at least one closeable opening adapted to circumvent the at least one filter,
    wherein the bypass is operated by a drive unit and arranged downstream of the at least one filter, and provided in a wall of the intake duct, and
    wherein the regulator orders the drive unit to activate the bypass which lets in unfiltered ambient air to a compressor of the static gas turbine in response to a request for more power output of the static gas turbine to increase the power output of the static gas turbine and then closes such that intake air is again drawn in and purified with the at least one filter.

2. The arrangement as claimed in claim 1, wherein the at least one closable opening is formed as a flap.

3. The arrangement as claimed in claim 1, further comprising:
    an intake housing with openings configured to draw ambient air through the at least one filter and into the compressor of the static gas turbine during the conventional operation of the static gas turbine; and
    wherein the at least one closeable opening in the wall of the intake duct is configured to draw unfiltered ambient air into the compressor to increase the power output of the static gas turbine during a frequency support event;
    wherein the at least one closeable opening is in a closed position during the conventional operation of the static gas turbine and wherein the at least one closeable opening is in an open position during the frequency support event.

4. The arrangement as claimed in claim 3, wherein the at least one closeable opening comprises flaps pivotally mounted in the wall of the intake duct.

5. The arrangement as claimed in claim 3, wherein the intake housing is positioned in a plane containing the compressor, a combustor and a turbine of the static gas turbine.

6. The arrangement as claimed in claim 3, wherein the intake housing is positioned outside of a plane containing the compressor, a combustor and a turbine of the static gas turbine.

7. A method for operating a static gas turbine equipped with at least one filter for purifying intake air during conventional operation, comprising:
    monitoring a grid frequency of an electrical distribution grid connected to a generator, wherein a rotor of the static gas turbine is connected to the generator;
    determining a frequency support event, based on a reduction in the grid frequency;
    circumventing the at least one filter such that partially to entirely unfiltered ambient air flows into the static gas turbine in response to the determining of the frequency support event thereby increasing a power output of the static gas turbine.

8. The method as claimed in claim 7,
    wherein the circumventing the at least one filter such that unfiltered ambient air flows into the static gas turbine is performed for a predefined period; and
    wherein the circumventing further comprises increasing a flow of fuel to the static gas turbine during the predefined period.

9. The method as claimed in claim 8, further comprising washing a compressor of the static gas turbine after the predefined period has expired, wherein the washing comprises:
    introducing a cleaning fluid into an intake duct upstream of the compressor;
    directing the cleaning fluid along the intake duct and into the compressor; and
    cleaning at least one blade of the compressor of particles that were deposited on the at least one blade by the flow of unfiltered ambient air into the static gas turbine.

10. The method as claimed in claim 8, wherein the predefined period is no longer than 15 minutes.

11. The method as claimed in claim 7, wherein the circumventing the at least one filter comprises:
    opening at least one closeable opening in a wall of an intake duct for intake air of the static gas turbine;
    drawing unfiltered air through the at least one closeable opening and into the static gas turbine for a predefined period; and
    closing the at least one closeable opening in the wall after expiration of the predefined period.

12. A method for operating a static gas turbine equipped with at least one filter for purifying intake air, comprising:
    during conventional operation, drawing in and purifying intake air with the filter;
    receiving a request for more power output of the static gas turbine in response to a determination of a frequency support event based on a monitored grid frequency;
    switching to a short-notice operational state for circumventing the filter from time to time based on the request such that partially to entirely unfiltered ambient air flows into a compressor of the static gas turbine;
    wherein the short-notice operational state comprises:
        actuating a bypass that circumvents the filter to let in unfiltered ambient air into the compressor for frequency support and to increase power output of the static gas turbine; and
        de-actuating the bypass such that intake air is again drawn in and purified with the filter.

13. The method as claimed in claim 12,
    wherein the unfiltered ambient air flows into the compressor at most for a predefined period.

14. The method as claimed in claim 12, further comprising:
    washing the compressor once the intake of the unfiltered ambient air has finished.

15. The method as claimed in claim 12, wherein
    determining the frequency support event comprises monitoring a grid frequency of an electrical distribution grid connected to a generator to determine a need for frequency support, wherein a rotor of the static gas turbine is connected to the generator and wherein the need for frequency support is determined based on a reduction in the grid frequency of the electrical distribution grid.

16. The method as claimed in claim 12,
    further comprising increasing a flow of fuel to the static gas turbine after actuating the bypass to further increase the power output.

17. The method as claimed in claim 12, wherein de-actuating the bypass is carried out:
    at an end of the request for more power output of the static gas turbine or after a predetermined time has elapsed for drawing in unfiltered ambient air.

18. The method as claimed in claim 12,
    wherein the bypass comprises at least one closeable opening downstream of the at least one filter, provided in a wall of an intake duct for letting in unfiltered ambient air.

* * * * *